United States Patent [19]

Shyu

[11] Patent Number: 5,259,553
[45] Date of Patent: Nov. 9, 1993

[54] INTERIOR ATMOSPHERE CONTROL SYSTEM

[75] Inventor: Jia-Ming Shyu, Hsinchu City, Taiwan

[73] Assignee: Norm Pacific Automation Corp., Taiwan

[21] Appl. No.: 976,283

[22] Filed: Nov. 13, 1992

Related U.S. Application Data

[63] Continuation of Ser. No. 680,758, Apr. 5, 1991, abandoned.

[51] Int. Cl.$^5$ ............................................. F25B 49/00
[52] U.S. Cl. .............................. 236/49.3; 236/44 C; 62/78; 62/176.6; 165/16
[58] Field of Search .................. 236/49.1, 49.3, 91 R, 236/91 C, 91 D, 44 C, 46 R, 47; 62/78, 176.6, 182; 165/16; 73/865.1, 865.6; 454/256, 258

[56] References Cited

U.S. PATENT DOCUMENTS

| | | | |
|---|---|---|---|
| 2,091,563 | 8/1937 | Palmer | 62/182 X |
| 3,402,654 | 9/1968 | Berst | 98/1.5 |
| 3,913,344 | 10/1975 | Holloway et al. | 236/44 C |
| 3,951,336 | 4/1976 | Miller et al. | 236/49.3 |
| 4,020,897 | 5/1977 | Enter | 236/49 C |
| 4,164,172 | 8/1979 | Anderten et al. | 62/78 X |
| 4,677,902 | 7/1987 | Takemasa | 62/78 X |
| 4,838,344 | 6/1989 | Murakami | 62/78 X |
| 4,873,649 | 10/1989 | Grald et al. | 62/176.6 X |
| 4,896,514 | 1/1990 | Sugiyama et al. | 62/78 X |

FOREIGN PATENT DOCUMENTS 2282670 3/1976 France .
0147244 6/1989 Japan .

Primary Examiner—Harry B. Tanner
Attorney, Agent, or Firm—Spencer, Frank & Schneider

[57] ABSTRACT

An interior atmosphere control system contains a group of sensors to detect/measure indoor and outdoor air temperature, humidity, air pressure, oxygen content, carbon-dioxide content, static electric charge, indoor wall temperature, sound and light. These measured results, through a signal transfer interface, are sent to a microcomputer which also accepts a user's command as input data through a user's interface. The microcomputer, based on a monitor/control program and data prestored in its memory unit, the sensed values, and the user's command, will then execute the necessary calculation, comparison and decision, and output adequate time variant control signals, through an output interface, to actuate a series of actuators to adjust the indoor temperature, humidity, air pressure, oxygen content, carbon-dioxide content, wind speed, static electric charge, magnetic field, sound, odor, and light which will generate different atmospheric modes, for example, to make people feel comfortable, refreshed, awakened, energetic, sleepy, uneasy, or even frightened. Above all, these feelings are promoted on the basis of the natural balance of human body, such as heat release and perspiration, by adjusting, the room temperature, humidity, wind speed and other factors.

23 Claims, 5 Drawing Sheets

Table of Atmosphere Modulating Factors

| Atmospheric Requirement | Main Control Factors# | Controlled Value/Status |
|---|---|---|
| Comfort | Temperature (D.B.)<br>Relative Humidity<br>Sound<br>Light | Summer 22-26°C, winter 20-24°C<br>35-70% relative to temperature<br>Soft<br>Gentle |
| Refreshment | Temperature (D.B.)<br>Relative Humidity<br>Odor<br>Sound | Summer 20-27°C winter 18-24°C<br>35-70% relative to temperature<br>fresh or favorite flavor<br>soft |
| Concentration | Temperature (D.B.)<br>Relative Humidity<br>Oxygen<br>Air Pressure<br>Light<br>Color | 18-27°C<br>30-75% relative to temperature<br>22-26%<br>Higher than outdoor air pressure<br>Bright<br>Harmonious |
| Drowsiness | Temperature (D.B.)<br>Carbon Dioxide<br>Relative Humidity<br>Light<br>Sound | 23-27°C<br>0.1-0.5%<br>50-70%<br>Obscure<br>Soft |
| Uneasiness | Temperature (D.B.)<br>Relative Humidity<br>Air Pressure<br>Sound | 25-32°C<br>70-85%<br>Lower than outdoor air pressure<br>Noisy |
| Fright | Temperature (D.B.)<br>Relative Humidity<br>Air Pressure<br>Light<br>Static Electric Charge | 14-20°C<br>75-90%<br>Lower than outdoor air pressure<br>Obscure and changing<br>Strong |

The controlled value/status of the control factors also varies cyclically with variable amplitude and frequency.

Table of Atmosphere Modulating Factors

| Atmospheric Requirement | Main Control Factors[#] | Controlled Value/Status |
|---|---|---|
| Comfort | Temperature (D.B.)<br>Relative Humidity<br>Sound<br>Light | Summer 22-26°C, winter 20-24°C<br>35-70% relative to temperature<br>Soft<br>Gentle |
| Refreshment | Temperature (D.B.)<br>Relative Humidity<br>Odor<br>Sound | Summer 20-27°C, winter 18-24°C<br>35-70% relative to temperature<br>fresh or favorite flavor<br>soft |
| Concentration | Temperature (D.B.)<br>Relative Humidity<br>Oxygen<br>Air Pressure<br>Light<br>Color | 18-27°C<br>30-75% relative to temperature<br>22-26%<br>Higher than outdoor air pressure<br>Bright<br>Harmonious |
| Drowsiness | Temperature (D.B.)<br>Carbon Dioxide<br>Relative Humidity<br>Light<br>Sound | 23-27°C<br>0.1-0.5%<br>50-70%<br>Obscure<br>Soft |
| Uneasiness | Temperature (D.B.)<br>Relative Humidity<br>Air Pressure<br>Sound | 25-32°C<br>70-85%<br>Lower than outdoor air pressure<br>Noisy |
| Fright | Temperature (D.B.)<br>Relative Humidity<br>Air Pressure<br>Light<br>Static Electric Charge | 14-20°C<br>75-90%<br>Lower than outdoor air pressure<br>Obscure and changing<br>Strong |

[#] The controlled value/status of the control factors also varies cyclically with variable amplitude and frequency.

INTERIOR ATMOSPHERE CONTROL SYSTEM

This application is a continuation application of Ser. No. 07/680,758, filed Apr. 5, 1991, abandoned.

BACKGROUND OF THE INVENTION

This invention relates to an automatic atmosphere conditioner which is capable of adjusting the atmospheric condition in a room. This invention discloses a method and a device to generate and control indoor atmosphere. The so-called atmosphere is not only the weather phenomenon or the air condition, but, more particularly, the environment of physiological and psychological states for the human. For example, we say, "the business negotiation goes under a harmonious atmosphere."

It is generally known that the human body is easily affected by various environments and generates various emotions in response to the environments. People can be in high spirits, or absent-minded or relaxed in response to environmental factors (characteristics) such as temperature (air temperature, wall temperature), humidity, air pressure, wind (air flow) speed, oxygen content, carbon-dioxide content, static electrical ion, sound, odor, light, magnetic field, etc. In consequence, those factors can be regulated to a specified status to make people concentrate on study, work or feel relaxed, drowsy, etc.

Figure 4A:
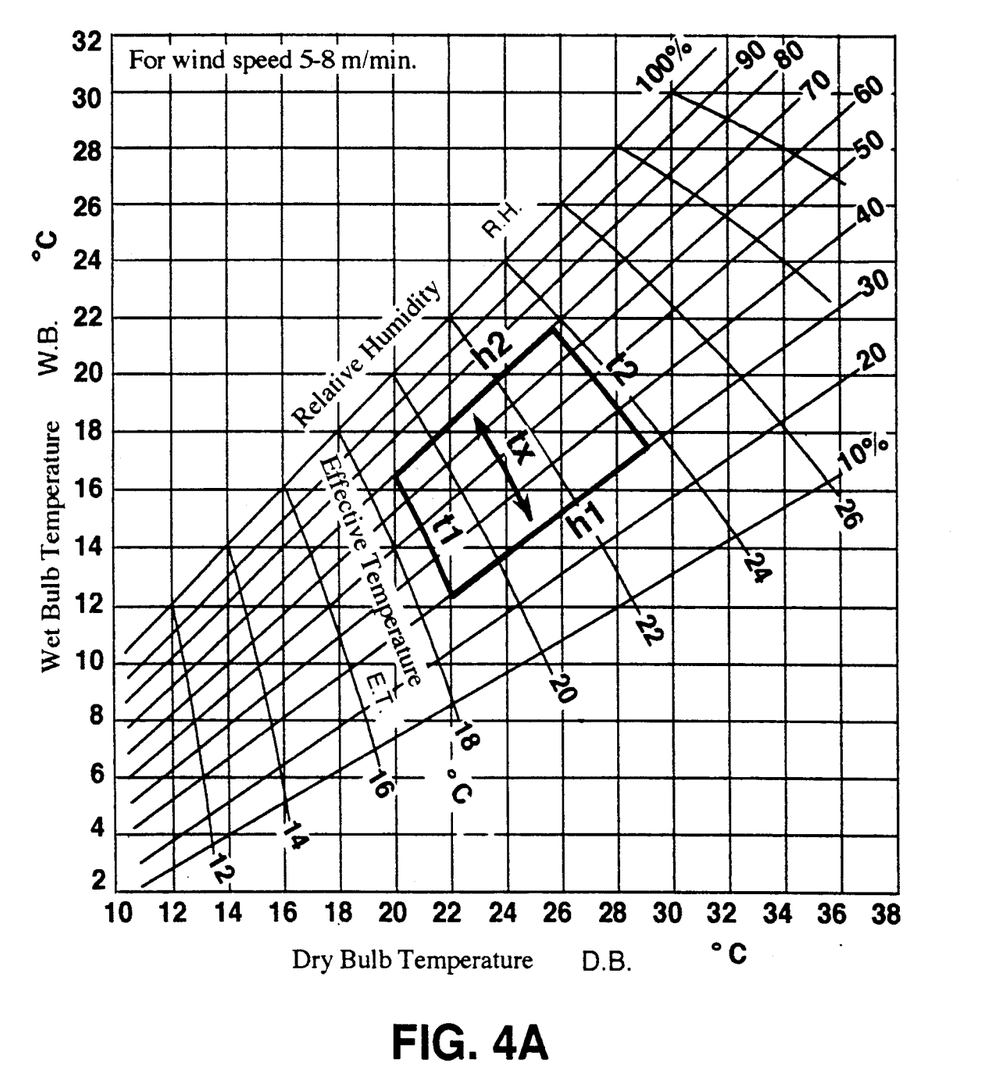
FIG. 4a and 4b are respectively a graph and a pair of curves, showing the indoor temperature and humidity to be controlled based on the physiological functioning of the human body.

The human body, which can be considered as a heat producer is usually exposed to an environment in which the temperature is lower than that of the body, and dissipates heat by continuous radiation, conduction, convection, breath and sweat. When the temperature difference between body and environment is large and the heat generation rate of the body is lower than its heat dissipation rate, people will feel cold; when the temperature difference between the body and its environment reaches a certain degree where the heat generation rate and the heat dissipation rate are in balance, people will feel comfortable; and when temperature difference mentioned is small or the temperature of the environment is higher than that of the body, people will feel irritable because the dissipated heat is not exhausted quickly enough. When people feel cold, the skin pores will naturally shrink to reduce sweat and lower the heat dissipation rate; on the other hand, intense exercise increases body heat, which can be dissipated by profuse sweat; that is, the human body has a self-modulated function of dissipating heat rate to sustain the body temperature. However, in order to easily modulate body heat rate and make people feel comfortable, appropriate air humidity and temperature are two of the most important factors. The indoor wall temperature (includes the temperature of all side walls, the ceiling and the floor) also has an influence, however, since the wall temperature will not be adjusted quickly, it will not be herein considered as a controlled factor of this invention to affect the thermal balance of body. What human the body feels is the so called effective temperature is referred to the dry bulb temperature with 100% relative humidity in still air. With a certain relation between humidity and temperature, people will feel the same effective temperature. For example, with an effective temperature 22° C., the dry bulb temperature of may vary increasingly from 23.6° C. to 26.6° C. if the relative humidity varies decreasingly from 70% to 30% (as shown in the appended FIG. 4-a). The relation of temperature and humidity, which can be controlled to provide a constant heat dissipation rate for the human body to obtain a thermal balance condition, can be explored to generate a favorable regulating response by stimulating skin or other sensory organs (such as shrinkage of skin pores, tension or relaxation of skin) and inspire spirits.

In the past, when people feel sleepy due to environment or excessive fatigue, the ways to keep awake are to wash the face with cold water, stimulate the skin mechanically or get up to exercise. However, these often fail to provide the desired effect due to laziness which is the human nature, short lasting or unavailable conditions.

Furthermore, a traditional air conditioning system is at most able to control temperature or humidity to a certain preset reading (the real control result is the controlled variables that varies slightly around the desired value.) Because of this, the human body will constantly dissipate heat by almost fixedly expanded skin pores (sweat gland). People will feel numb or drowsy as the skin pores keep the same expansion for a long time; and once they leave the controlled environment, to become subject to outdoors' quite different temperature and humidity, they are easily attacked by heat-stroke or catch a cold.

Air pressure and air content also have a great effect on the human body. When the pressure drops or the oxygen content lessens, people will feel sick because of difficulty in breathing. On the other hand, if oxygen is in adequate supply or the indoor pressure is increased adequately, people will breathe smoothly, keep alert and improve their working efficiency. The concentration of carbon dioxide in the natural world is 0.03%~0.05%. If the indoor carbon dioxide concentration is up to 0.2%~0.5%, people will feel bored and drowsy; if the concentration exceeds 0.5%, it will cause physiological malfunctions or even lead to death. The conventional air conditioner can not control air pressure or air content. The air exchange design of a conventional air conditioner only opens a valve between the indoor and outdoor environments and can not control the amount and direction of incoming or outgoing air. Therefore, it can not effectively expel the dirty indoor air or induce clean and fresh outdoor air.

Air flow speed also affects the environment. When it is like a gentle breeze, people will feel cozy (comfortable) and drowsy; when it becomes a gusty wind, people will feel nervous and uneasy because it seems that an imminent catastrophe is just ahead.

The human skin not only perceives cold/hot feeling and sense of touch, the body hairs can also be made to stand on end. People may shudder with fear (fright) or feel excitement when the hair is affected by a static electric field or attachment of ions. Besides, a magnetic field may affect a human's body or spirit, but the effect has not been fully understood yet.

The odor also affects one's mood; for example, an offensive smell may cause nausea. People in an environment which simulates a garden or forest will feel pleasant and refreshed.

Noise may also bother one's feelings. For example, soft music makes people feel leisurely, classic music makes people feel elegant, and rock and roll make people eager to dance. Apparently, sound and music affect people's mood quite a bit.

Moreover, indoor light may also affect people's physiological reaction; such as obscure light makes people feel drowsy; soft light and color make people feel romantic; bright light and color make people feel sober; and abundant light makes people concentrate on work or study.

However, there is no atmosphere control system in the present market that can wholly modulate/control the above mentioned atmospheric factors. The indoor environment consequently can not be adjusted to meet the users' respective requirements.

SUMMARY OF THE INVENTION

Based on those reasons, the present invention first provides an atmosphere control system that controls of indoor atmospheric factors so as to generate different atmospheric effects to make people feel cozy, refreshed, able to concentrate, sleepy, uneasy, or even frightened.

The invention secondly provides an atmosphere control system that adjusts the physiological reaction of human body based on the control and adjustment (manipulation) of environmental factors including temperature, humidity, wind speed, etc. and effect on adequate heat dissipation rate of the human body to meet the principles of thermal balance.

The invention thirdly provides an atmosphere control system that modulates/controls the difference between the indoor and outdoor temperature indoor humidity and the indoor wind speed (air flow). It can help persons avoid heat-stroke or catching cold while entering or leaving a room.

The invention fourthly provides an atmosphere control system that controls the indoor air pressure and purifies the air content by drawing in or expelling an adequate amount of air.

The invention fifthly provides an atmosphere control system that provides a specified atmosphere based on an integrated control of such factors as indoor sound, light, odor, static electricity and magnetic field, etc.

The invention sixthly provides an atmosphere control system that generates various odors or kills germs or insects by injecting or expelling various odors, disinfectant or insecticide automatically.

To achieve the above mentioned objects, the indoor atmosphere control system according to the invention comprises sensors to respectively detect/measure indoor/outdoor air temperature, humidity, air pressure, oxygen content, carbon dioxide content, air cleanliness and static electric charge and sensors to respectively detect/measure indoor wall temperature, sound volume and light. Signals from the sensors are sent to a microcomputer through a signal transfer interface. The microcomputer is informed of user requirements through a user interface, calculates a sensed value provided by each sensor, compares the values with prestored data, and outputs adequate control signals through an control interface to actuate a series of actuators which modulate indoor temperature, humidity, air pressure, oxygen content, carbon dioxide content, airflow speed, static electric charge, magnetic field, sound, odor, light, etc. Different indoor atmosphere effects will be generated thereby.

BRIEF DESCRIPTION OF THE DRAWINGS

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
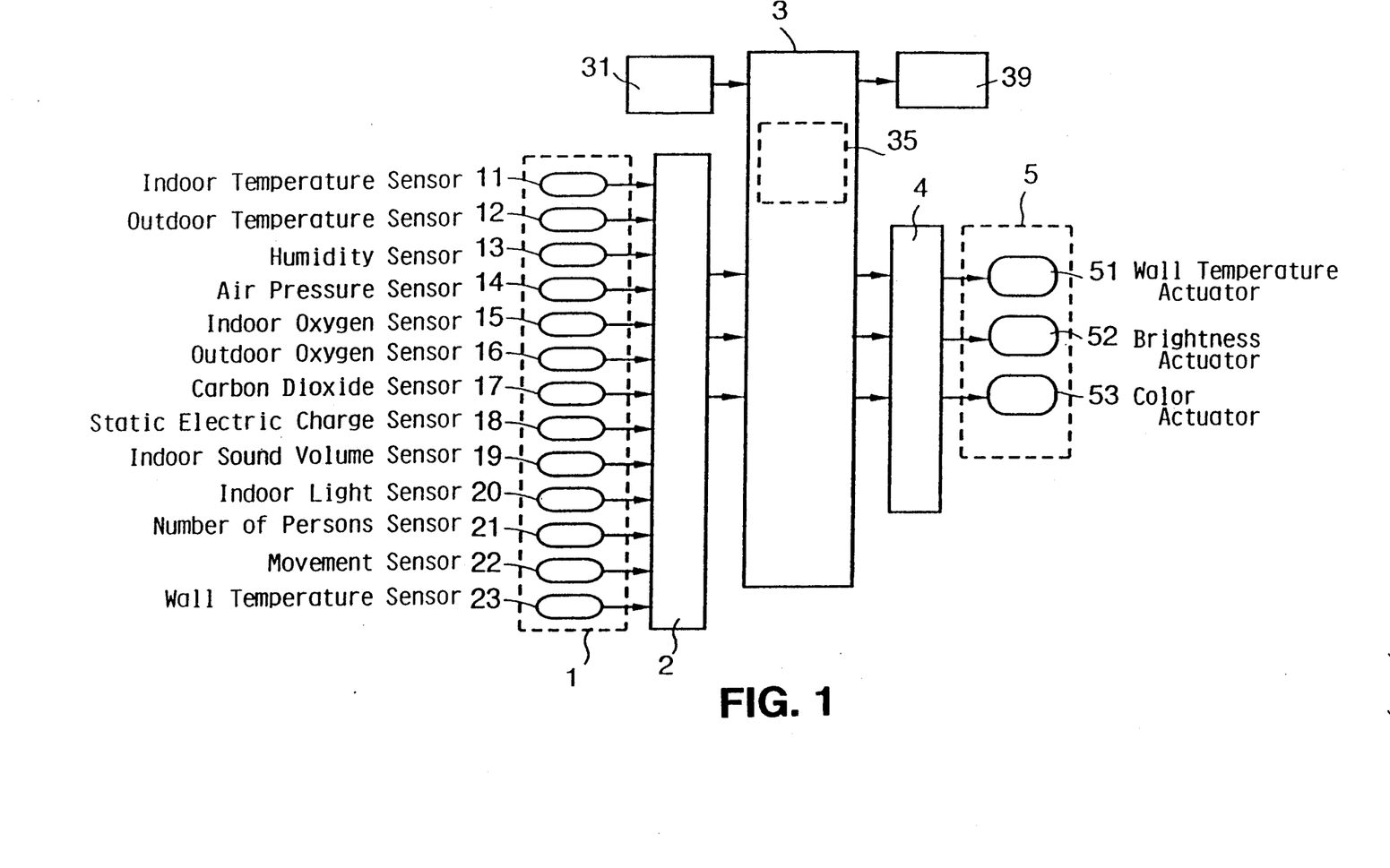
FIG. 1 is a block diagram illustrating the basic construction of the invention.

FIG. 1 shows the basic construction of the present invention including: a group of individual sensing devices 1 which consists of sensors for detecting and measuring the values of the environmental characteristics, namely indoor air temperature (sensor 11), outdoor air temperature (sensor 12), humidity (sensor 13), air pressure (sensor 14), indoor oxygen content (sensor 15), outdoor oxygen content (sensor 16) carbon dioxide content (sensor 17), static electric charge (sensor 18), indoor sound volume (sensor 19), brightness of light (sensor 20), number of persons in a room (sensor 21), movement of a human body (sensor 22) and indoor wall temperature (sensor 23). All the output signals of the sensor will be fetched by a microcomputer 3 through a signal transfer interface 2. The requirement input by the user's interface 31 will be received by the microcomputer 3 which will measure/detect the sensed values of the sensing devices 1 based on a prestored program and prestored data in a memory unit 35 and output control signals through an actuation interface 4 to actuate a series of actuation devices 5 which contain various actuators to modulate indoor air temperature, indoor wall temperature (actuator 51), humidity, air pressure, oxygen content, carbon dioxide content, wind speed, (air flow speeds) static electric charge (ion-concentration) magnetic field, sound, odor, brightness (actuator 52), color (actuator 53), etc. The output through microcomputer 3 can also be displayed by a display 39.

Figure 2:
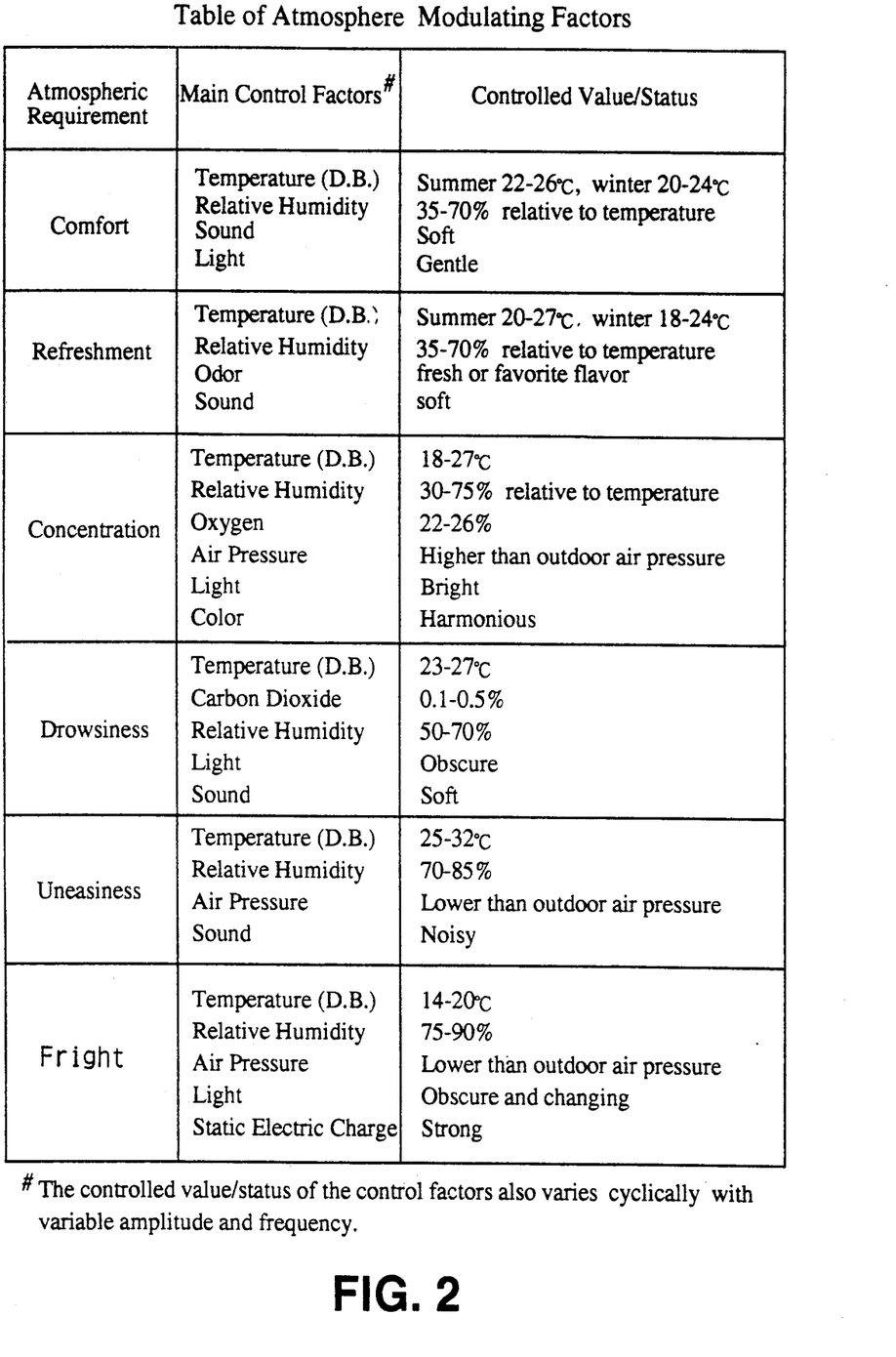
FIG. 2 is a table listing an example of the modulation of different atmosphere control factors of the invention.

The program and data prestored in the memory unit 35 include the ranges of values of various control factors corresponding to various atmosphere requirements for effecting the way people feel with respect to such things as comfort, freshness, concentration, sleep, disturbance, or fear). For example, as shown in FIG. 2, when the indoor temperature is controlled between 22°~26° C. in the summer or 20°~24° C. in the winter, the humidity is relatively modulated between 70~35%, (this provides an effective temperature on the human body of around 19°~22° C.) and soft music is provided in the meantime, then as a matter of course, a comfortable atmosphere is generated. On the contrary, it will make people feel disturbed if the indoor temperature is kept around 25°~32° C., humidity around 70~85%, the air pressure is lowered a little bit and more noise is made. These various items and their ranges can be modified, based on the results of different experiments, to meet the requirements of different persons, jobs, time and locations. Moreover, the monitoring program and data in the memory unit 35 also include switching procedures; for example, while executing a "sleep atmosphere", it can start from "drowsy atmosphere", and then smoothly change to the next adequate modes and finally switch to "awakened atmosphere" to make people wake up.

The modulation of environmental characteristics including temperature, humidity, wind speed, etc. in this invention can be implemented based on the operation of a conventional air conditioner. As an embodiment of this invention shown in FIG. 3, the air conditioner is basically constructed to include a refrigerant (R-22) compressor R, an indoor heat exchanger E1 and its fan F1 and motor M1; an outdoor heat exchanger E2 and its fan F2 and motor M2; a 4-way directional value S, an expansion valve D and unshown refrigerant circulated in the tubes. The 4-way valve S controls the flow directions of high temperature high pressure refrigerant output from compressor R; that is, when the valve S is in the position S1, the refrigerant compressed by compressor R and output through tube L1 will be connected to tube L2 and reach outdoor heat exchanger E2 to be condensed (the outdoor air exhaust A2 is warm air). Then, through expansion valve D, the refrigerant reaches heat exchanger E1 to be evaporated (the indoor air supply A1 is cold air); after that, the low temperature, low pressure refrigerant is connected to tube L4 and drawn back to compressor R. This is the circulation for cooling. On the contrary, when the valve S is in the position S2, tube L1 will be connected to tube L3, tube L2 will be connected to tube L4, and this forms the circulation path for heating. The generation of indoor warm air can also use an unshown electric heating apparatus. The aforesaid construction is of the prior art. This invention further has a humidifier 54 and/or an unshown dehumidifier by which, the indoor humidity can be modulated by mixing original indoor air with the dehumidified indoor air coming through the indoor heat exchanger E1). This invention can also fully control the indoor/outdoor air pressure differential and air intake/exhaust (by exchanging or mixing indoor and outdoor air) based on an inlet valve (flap) V1, an outlet valve (flap) V2 and piping between them. The valve V1 enables the indoor air supply A1 to come from indoor air return A11, outdoor air intake A12, or a mixture of those two in any desired ratio. The valve V2 enables the outdoor air exhaust A2 to come from indoor air A21, outdoor air A22, or a mixture of those two in any desired ratio, and, in consequence, the indoor air pressure can be controlled and the indoor air can be purified (each opening of inlet/outlet air has a filter F to filter out the dirt in the air). Since the air intake/exhaust of indoor/outdoor fans F1 and F2 are controlled by the rotation of motors M1 and M2 respectively, and the humidifier 54 and an oxygen supply device 55 can be actuated, the indoor temperature, humidity, air pressure, air content, etc., can be modulated to any condition conforming to outdoor conditions. For example, when some characteristics of the outdoor air condition (temperature, humidity, oxygen content, carbon dioxide content, etc.) are closer to the required values than those in the present indoor condition, the valve V1 will open appropriately to intake outdoor air A12 by means of fan F1, or the valve V2 will open appropriately at the same time to discharge indoor air A21 by means of fan F2, to give the effect of exchanging air or mixing air. When the indoor air pressure is to be increased, the valve V1 for outdoor air A12 is increasingly opened and the valve V2 for indoor air A21 is shut down gradually, or the motor M1 is sped up at the same time, and the outdoor air will be drawn indoors. On the contrary, when the indoor air is to be exhausted or the indoor air pressure is to be lowered, the valve V2 for indoor air A21 is increasingly opened and the valve V1 for outdoor air A12 is shut down gradually, or the motor M2 sped up at the same time, and the indoor air will be forced outdoors. The temperature of indoor air supply A1 is decided by the temperature of mixed indoor and outdoor air A11, A12 and the heat-exchange rate of indoor heat exchanger E1. The heat-exchange rate is decided by the speed of motor M1 and the opening rate of expansion valve D. The humidity of air supply A1 is decided by the humidity of the mixed indoor and outdoor air A11, A12, and the humidifying rate of humidifier 54 or dehumidifying rate of the indoor heat exchanger E1. Besides, an oxygen supply device 55 can provide the required content of oxygen, and an odor/disinfectant/insecticide supply device 56 can provide a spray or liquid A13 of specified odor or drug, which will be mixed with indoor air supply A1 and generate a specified atmosphere. The microcomputer 3 (as shown in FIG. 1) receives the output signals of the above mentioned indoor and outdoor sensing devices 1 and, based on the requirement, sends out appropriate control signals to the actuation interface 4 to perform the required actuations; for example, the human body sensor 20 of the sensing devices 1 can scan and detect the number of indoor persons and automatically control the amount of air exchange. (The amount of air exchange therefore is in proportion to the number of indoor persons.) The actuators further include an ion generator 57 which provides required static electric charge for the indoor atmosphere, a magnetic field regulator 58 which regulates the intensity and direction of indoor magnetic field, a sound regulator 59, and light intensity (brightness) regulator 52 and color regulator 53 can generate atmosphere of specified sound, light intensity and color, respectively. The humidifier 54 and odor/disinfectant/insecticide supply device 56 can utilize a moisturized net, a nozzle or an ultrasonic humidifier. The oxygen supply device 55 can utilize an air storage tank or an oxygen generator from electrolysis. The static electric charge generator 57 can function with high voltage ionized air to generate negative ions. The magnetic regulator 58 can function with an electromagnet. The sound, light and other regulators can utilize any existing technologies which are not necessary to be described further.

Figure 3:
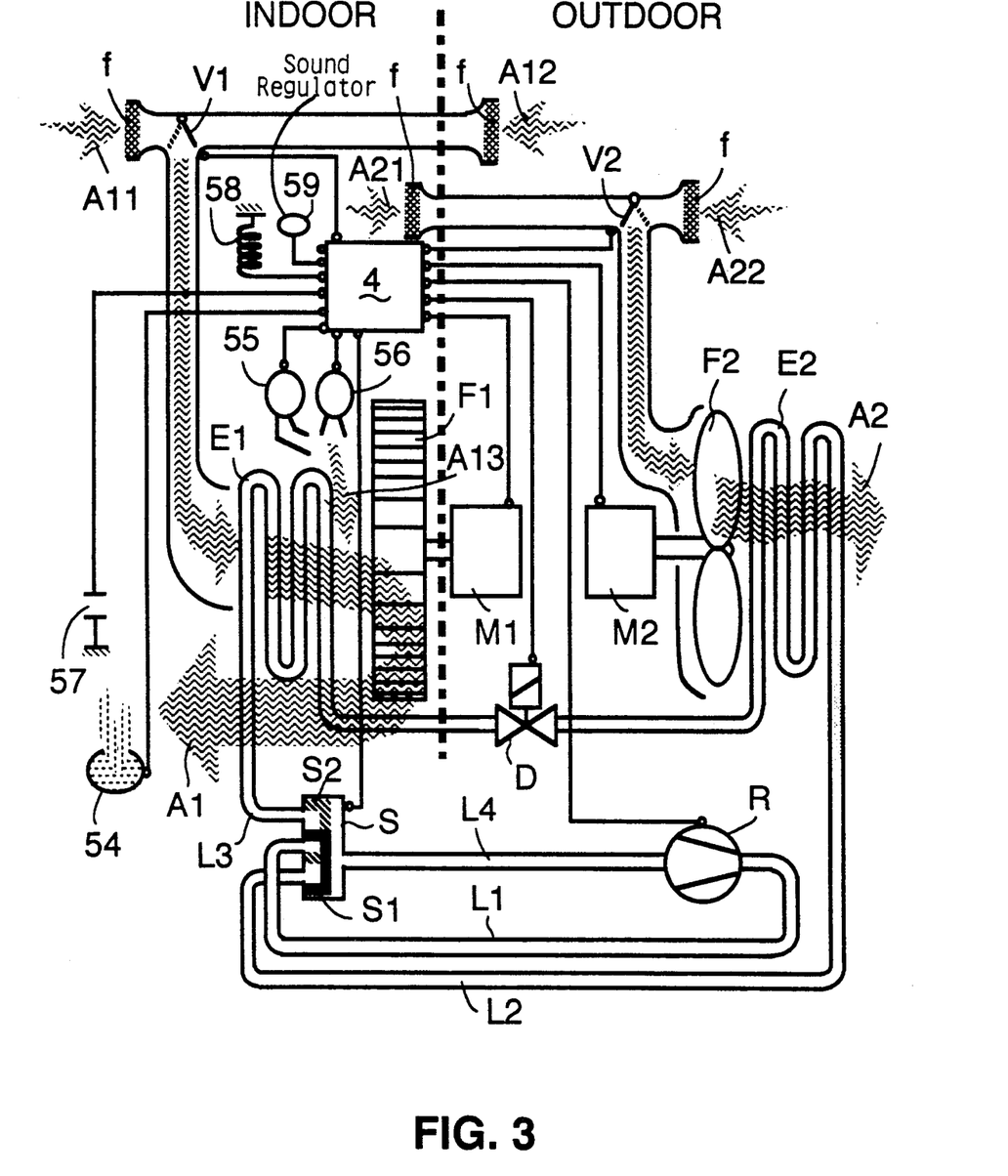
FIG. 3 is a schematic diagram of an embodiment of the invention.

The above mentioned air exchange and odor/disinfectant/insecticide supply device 56 can shoot out and remove odor automatically to generate a different atmosphere or obtain the effect of killing germs or insects; that is, the supply device 56 can generate a required odor based on the time setting and preset amount of odor; or when nobody is home, the disinfectant or the insecticide will be discharged to the room air and hold for a preset period of time until the indoor germs or insects are all dead; the device will then operate indoor/outdoor air exchange automatically, and the indoor air will be kept refreshing when someone returns.

Figure 4B:
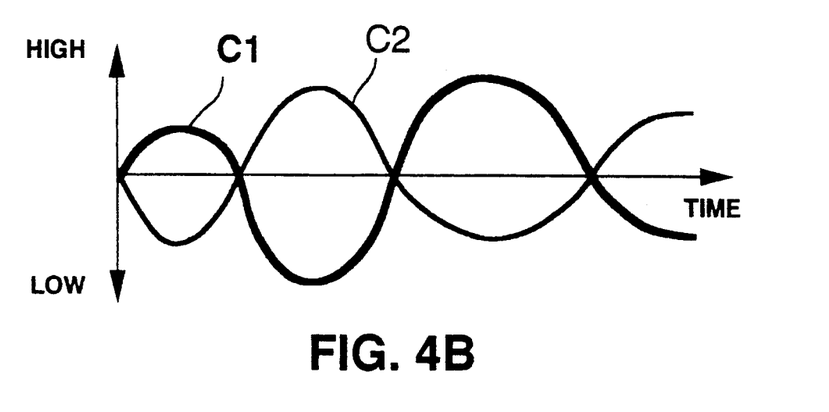

This invention regulates and controls the indoor temperature and humidity based on the principles of sweat dissipation rate and respiration (thermal balance) of the human body: that is, the body temperature, wall temperature, air temperature, humidity and wind speed are regulated with time-variation control to fit the physiological functioning of the human body such as the shrinkage/openness of the skin pores and tense/relaxation of the skin. This invention will modulate differences of indoor temperature, humidity and the air flow based on those outdoor variant factors. In consequence, the human can avoid heat-stroke or catching cold while moving between an outdoor environment and an indoor environment. The characteristics of these controls, with respect to the relationship of domains of temperature and humidity, will be further described with reference to FIG. 4.

FIG. 4-a shows the relationship among dry bulb temperature (D.B.; horizontal axis), wet bulb temperature (W.B.; vertical axis), relative humidity (R.H.; oblique line directed to the upper right) and effective temperature (E.T. curved line directed to the lower right) felt by the human body when the room air flow speed is in the range of 5-8 m/min. Through statistical evaluation, the domain of temperature and humidity in which people feel comfortable is obtained as shown in the figure within the zone surrounded by lines of constant of effective temperature ($t_1$ and $t_2$) and constant relative humidity ($h_1$ and $h_2$). (It is of normal distribution. The central value of the comfort zone represents the favorite conditions for most people.) The zone may vary with the seasonal dress, racial custom, etc. This invention is to control temperature, humidity and air flow speed relatively and provides the desired so-called effective temperature felt by the human body. (As shown in FIG. 4-b, there are sinusoidal curves of the same effective temperature tx which may be obtained by increasing temperature C1 with decreasing humidity C2 or decreasing temperature C1 with increasing humidity C2, i.e., the curves are out of phase with each other). This will keep a proper heat dissipation rate for the human body and makes people feel comfortable. Consequently, temperature and humidity can be regulated anytime to stimulate the skin pores of the human body to inspire spirit. On the other hand, as the conventional air conditioner fixes the value of temperature and humidity, the sweat gland and skin of the human body keeps expanding or shrinking all the time. People will feel numb and drowsy, and once they leave the room, they are not able to adapt themselves to the sharp impact of outdoor temperature and humidity and may because to suffer heat-stroke or catch cold. As a result, this invention will gradually adjust the air flow speed that blows on the user while he moves into or out of the room; that is, to help people adapt themselves to the environment, the invention will reduce indoor/outdoor temperature and humidity differences. (The movement of a person into and out of the room can be detected by a sensor of movement of a human body.) The above mentioned modulation of indoor temperature and humidity, does not mean to provided a fixed effective temperature, but to keep the indoor temperature and humidity in a range (such as the shown comfort zone) conforming to the outdoor situation. The skin pores and skin should be stimulated in accordance with the reaction rate of the human body; for example, the period of each sinusoidal variation can be around 10~60 minutes—practically, the amplitude and frequency can be adjusted based on various requirements.

The invented atmosphere control system can modulate environmental factors to set a specified atmosphere through integrated control of indoor temperature, humidity, air pressure, air content, sound, light, odor, static electricity, magnetic field, etc. It can be applied to many places. For example, in a room for study, the classroom or the working place, it can be controlled to promote concentration so as to give encouragement and improvement of working efficiency; in a restaurant, it can provide a refreshing atmosphere to give an appetite; in an amusement place, it can provide a refreshing or specified atmosphere to make people feel joyful; in a vehicle or boat, it can provide a concentrative or refreshing atmosphere to avoid drowsiness or carsickness; in the bedroom, it can provide a drowsy or comfortable atmosphere to make people feel sleepy or promote romantic feelings; in an interrogation room, it can provide different atmosphere to make a suspect confess without covering up; and in a conference or meeting room, it can provide a refreshing or harmonious atmosphere to enhance the negotiating effect and reduce conflict.

While preferred embodiments of the invention have been described in detail, it is particularly understood that the invention in not limited thereto or thereby, and it is evident to those skilled in the art that various changes and modifications may be made therein without departing from the invention.

What is claimed is:

1. An atmosphere control system for an interior space, comprising:

means for sensing values of each of a first plurality of environmental characteristics of the interior space and each of a second plurality of environmental characteristics of an exterior space, wherein the first plurality of characteristics includes at least temperature and humidity of air in the interior space, and wherein the second plurality of characteristics includes at least temperature and humidity of air in the exterior space;

means for changing at least the temperature and humidity of the interior air;

means for storing a plurality of sets of possible values of the first plurality of characteristics, including possible values of the temperature and humidity of the interior air, each possible value set corresponding to a different one of a plurality of physiological/psychological effects on occupants of the interior space, the plurality of physiological/psychological effects including at least one of promoting a feeling of comfort, promoting a feeling of refreshment and promoting concentration; and means, responsive to the values sensed by said sensing means and a selection of any one of the plurality of physiological/psychological effects, for controlling said changing means to change the values of the first plurality of characteristics to values in the set which corresponds to the selected effect, thereby to obtain the selected effect.

2. A system according to claim 1, wherein said storing means stores possible value sets respectively corresponding to the effect of promoting a feeling of comfort, the effect of promoting a feeling of refreshment and the effect of promoting concentration.

3. A system according to claim 1, wherein the sets of possible values stored in said storing means includes a set of possible values corresponding to one of the physiological/psychological effect of promoting drowsiness, the physiological/psychological effect of promoting uneasiness, and the physiological/psychological effect of promoting fright.

4. A system according to claim 1, wherein the first plurality of characteristics includes at least one of three environmental characteristics, the three environmental characteristics including pressure of the interior air, oxygen content of the interior air and carbon dioxide content of the interior air.

5. A system according to claim 4, wherein said means for changing comprises means for changing a value of said at least one of three environmental characteristics.

6. A system according to claim 1, wherein the values sensed by said sensing means includes values of air pressure in the interior space and air pressure in the exterior space, and said means for changing comprises means for changing the air pressure in the interior space.

7. A system according to claim 1, wherein said sensing means includes means for sensing movement of a human body in the interior space.

8. A system according to claim 1, wherein said means for changing comprises means for changing at least one of brightness and color of light in the interior space, oxygen content of the interior air, air flow speed of the interior air, an amount of air exchanged between the interior space and the exterior space, odor of the interior air, sound in the interior space, static electric charge in the interior space, magnetic field in the interior space, an interior wall temperature in the interior space.

9. A system according to claim 1, wherein said means for controlling comprises means for controlling said changing means to modulate the temperature and humidity of the interior air so that the temperature of the interior air is increased and decreased while the humidity of the interior air is being respectively decreased and increased, in such a manner as to provide a comfortable heat dissipation rate and stimulation of the skin of persons in the interior space.

10. A system according to claim 1, wherein said controlling means comprises means for automatically and smoothly switching from control according to one set of possible values stored by said storing means to control according to another set of possible values stored by said storing means.

11. A system according to claim 1, wherein the plurality of physiological/psychological effects includes promoting a feeling of comfort, said means for changing comprising means for changing brightness of light in the interior space and an amount of exchange of air between the interior space and the exterior space, the set of possible values corresponding to promoting a feeling of comfort including ranges of temperature and humidity of the interior air, brightness of the light in the interior space, and amount of exchange of air between the interior space and the exterior space, said means for controlling comprising means for controlling said changing means to modulate the temperature and humidity of the interior air sinusoidally.

12. A system according to claim 1, wherein the plurality of physiological/psychological effects includes promoting a feeling of refreshment, said means for changing comprising means for changing odor in the interior space and an amount of exchange of air between the interior space and the exterior space, the set of possible values corresponding to promoting a feeling of refreshment including ranges of temperature and humidity of the interior air, and amount of exchange of air between the interior space and the exterior space, said means for controlling comprising means for controlling said changing means to modulate the temperature and humidity of the interior air sinusoidally.

13. A system according to claim 1, wherein the plurality of physiological/psychological effects includes promoting concentration, the values sensed by said sensing means further including values of air pressure in the interior space and air pressure in the exterior space, said means for changing comprising means for changing the brightness of light and the air pressure in the interior space and an amount of exchange of air between the interior space and the exterior space, the set of possible values corresponding to promoting concentration including possible ranges of temperature and humidity of the interior air, brightness of the light in the interior space, and amount of exchange of air between the interior space, and amount of exchange of air between the interior space and the exterior space, said means for controlling comprising means for controlling said changing means to modulate the temperature and humidity of the interior air sinusoidally and maintain the air pressure in the interior space higher than the air pressure in the exterior space.

14. A system according to claim 1, wherein the plurality of physiological/psychological effects includes promoting a feeling of drowsiness, said means for changing comprising means for changing brightness of light in the interior space and carbon dioxide content of the interior air, the set of possible values corresponding to promoting a feeling of drowsiness including possible ranges of carbon dioxide content, temperature and relative humidity of the interior air, and the brightness of light in the interior space.

15. A system according to claim 14, wherein the possible range of temperature is 23-27 C., the possible range of carbon dioxide content is 0.1 to 0.5%, the possible range of relative humidity is 50-70%, and the brightness of light is low.

16. A system according to claim 1, wherein the plurality of physiological/psychological effects includes promoting uneasiness, the values sensed by said sensing means further including values of air pressure in the interior space and air pressure in the exterior space, said means for changing comprising means for changing the air pressure in the interior space, the set of possible values corresponding to promoting uneasiness including possible ranges of temperature and relative humidity of the interior air, said means for controlling comprising means for controlling said changing means to maintain the air pressure in the interior space lower than the air pressure in the exterior space.

17. A system according to claim 16, wherein the possible range of temperature is 25-32 C., the possible range of carbon dioxide content is 0.1 to 0.5%, and the possible range of relative humidity is 70-85%.

18. A system according to claim 1, wherein the plurality of physiological/psychological effects includes promoting fright, the values sensed by said sensing means further including values of air pressure in the interior space and air pressure in the exterior space, said means for changing comprising means for changing brightness of light in the interior space and the air pressure in the interior space, the set of possible values corresponding to promoting fright including possible ranges of temperature and humidity, and brightness of light, said means for controlling comprising means for controlling said changing means to maintain the air pressure in the interior space lower than the air pressure in the exterior space and to modulate the brightness of light in the interior space.

19. A system according to claim 10, wherein said means for changing comprising means for discharging an insecticide or a disinfectant into the interior air, and means for exchanging air between the interior space and the exterior space, said controlling means including means for controlling said discharging means to discharge the insecticide or disinfectant and for automatically controlling said exchanging means to exchange air between the interior space and the exterior space only after a predetermined period of time following the discharge the insecticide or disinfectant.

20. A system according to claim 1, wherein the values sensed by said sensing means includes a number of persons occupying the interior space.

21. An atmosphere control system for an interior space, comprising:

means for sensing each of a first plurality of environment characteristics of the interior space and each of a second plurality of environmental characteristics of an exterior space, wherein the first plurality of characteristics includes at least temperature and humidity of the air in the interior space, and wherein the second plurality of characteristics includes at least temperature and humidity of air in the exterior space, said sensing means generating signals respectively corresponding to the sensed characteristics;

means for changing at least the temperature and humidity of the interior air; and means, responsive to a selection signal and the signals generated by said generating means, for controlling said changing means to modulate the interior air temperature and humidity so that the interior air temperature is increased and decreased while the interior humidity is being respectively decreased and increased, in such a manner as to provide a comfortable heat dissipation rate, and stimulation of the skin, of any persons in the interior space.

22. An atmosphere control system for an interior space, comprising:

means for sensing each of a first plurality of environmental characteristics of the interior space and each of a second plurality of environmental characteristics of an exterior space, wherein the first plurality of characteristics includes at least temperature, humidity and pressure of air in the interior space, and wherein the second plurality of characteristics includes at least temperature, pressure and humidity of air in the exterior space, said sensing means generating signals respectively corresponding to the sensed characteristics;

means for changing at least the temperature, humidity and pressure of the interior air, and for changing brightness of light in the interior space;

means for controlling said changing means; and means storing a plurality of algorithms, each algorithm corresponding to a control of the first plurality of characteristics to provide one of a plurality of different physiological/psychological effects on occupants of the interior space, the plurality of physiological/psychological effects including at least promoting a feeling of comfort, promoting a feeling of refreshment, promoting concentration and promoting a feeling of drowsiness, said controlling means being responsive to a selection of any one of said algorithms to control said changing means, and thereby the first plurality of characteristics, according to the selected algorithm.

23. A system according to claim 22, wherein the first plurality of characteristics includes carbon dioxide content of the interior air, said means for changing including means for changing the carbon dioxide content of the interior air, and the plurality of physiological/psychological effects includes promoting a feeling of uneasiness and promoting a feeling of fright.

* * * * *